United States Patent [19]
Linton

[11] 3,889,606
[45] June 17, 1975

[54] CONVEYOR CONTROL MEANS
[75] Inventor: A. Leon Linton, Memphis, Tenn.
[73] Assignee: Southern Systems, Memphis, Tenn.
[22] Filed: Mar. 18, 1974
[21] Appl. No.: 452,433

[52] U.S. Cl. .............................. 104/172 S; 104/96
[51] Int. Cl. ............................................. B61b 13/00
[58] Field of Search............ 104/88, 96, 130, 172 R, 104/172 BT, 172 C, 172 S; 188/33, 38, 40, 56

[56] References Cited
UNITED STATES PATENTS

| 2,987,012 | 6/1961 | King | 104/172 S |
| 3,314,378 | 4/1967 | Potter | 104/96 |
| 3,618,532 | 11/1971 | Clewett | 104/96 |
| 3,726,233 | 4/1971 | Swartz | 104/96 |

Primary Examiner—M. Henson Wood, Jr.
Assistant Examiner—D. W. Keen
Attorney, Agent, or Firm—John R. Walker, III

[57] ABSTRACT

A control means for use with a typical conveyor system for causing a trolley member of the conveyor system to be selectively driven by a pusher member of the conveyor system to move a load from one location to another. The control means includes cam means fixedly mounted to the conveyor system in proximity with the trolley member and includes dog means movably mounted to the trolley means. The dog means includes a pin member and cam follower means mounted to the pin member for coacting with the cam means to cause the pin member to move between a first position out of the path of the pusher member to allow the pusher member to move without moving the trolley member and a second position in the path of the pusher member to allow the pusher member to drive the trolley member.

8 Claims, 5 Drawing Figures

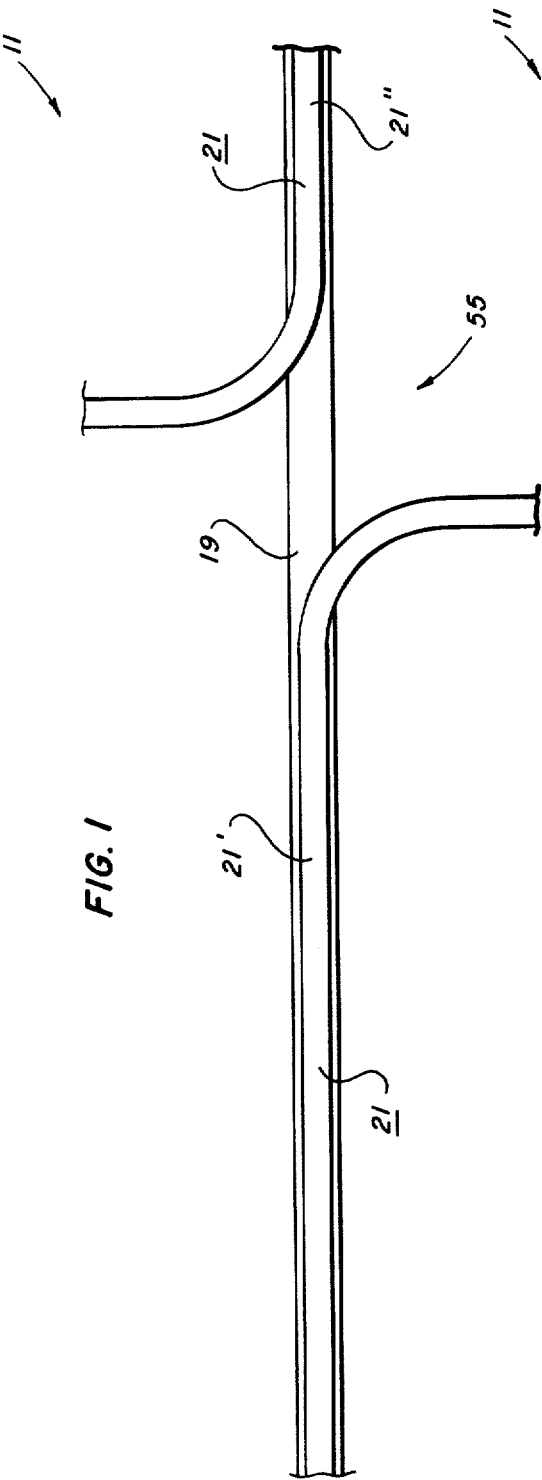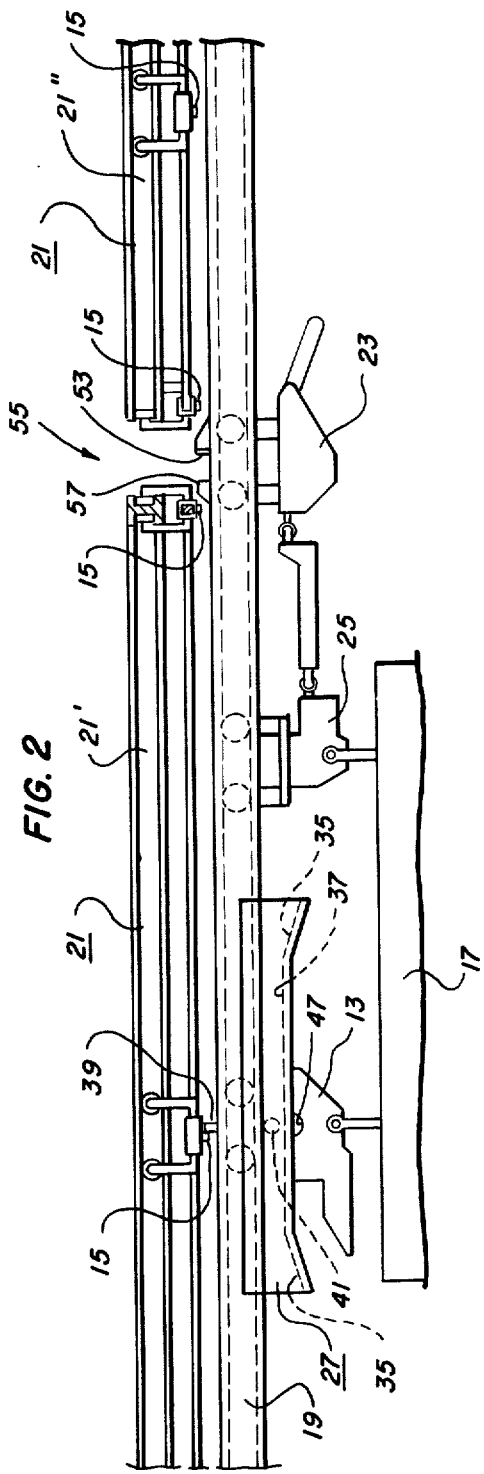

3,889,606

CONVEYOR CONTROL MEANS

BACKGROUND OF THE INVENTION

1. Field of the Invention

This invention relates generally to conveyor systems and more specifically to control means for causing a trolley member of the conveyor system to be selectively driven by a pusher member of the conveyor system to move a load from one location to another.

2. Description of the Prior Art

The following patents relate generally to the present invention: De Burgh, U.S. Pat. No. 2,317,675; Dehne, U.S. Pat. No. 3,044,415; Dehne, U.S. Pat. No. 3,229,645; Dehne, U.S. Pat. No. 3,314,377; Kondur et al., U.S. Pat. No. 3,397,650; and Curry et al., U.S. Pat. No. 3,451,352. None of the above patents disclose or suggest the present invention. The '645 and '377 patents disclose power and free conveyors in which a drop section in a power track allows a pusher member supported from the power track to selectively contact and drive a trolley member movably supported on a load supporting track. This type of control means is disadvantageous in that the drop sections of the power track increase both the cost of the conveyor system and the engineering problems therein. The '352 reference discloses a power and free conveyor in which a trolley member movably supported on a load supporting track is selectively driven by a power member supported from a power track by means of a drive dog being pivotable by cam means from a down position out of contact with the pusher member and an up position in contact with the pusher member to enable the pusher member to contact and drive the trolley member. This type control means is disadvantageous in that, among other reasons, it is unsafe because pinch points are created by the rotating drive dog and it is highly susceptible to malfunctioning because the rotating drive dog is easily clogged by contaminated ambient conditions such as in paint finishing systems and corrosive part washers.

SUMMARY OF THE INVENTION

The present invention is directed towards overcoming the problems and disadvantages in previous conveyor control means. The concept of the present invention is to provide a control means for use with a typical conveyor system which includes a trolley member selectively driven by a pusher member to move a load from one location to another. The control means includes cam means fixedly mounted to the conveyor system in proximity with the trolley member and includes dog means movably mounted in the trolley member. The dog means includes a pin member for vertical movement between a first position substantially within the trolley member and out of the path of the pusher member to allow the pusher member to move without moving the trolley member and a second position extending out of the trolley member and in the path of the pusher member to allow the pusher member to drive the trolley member. The dog means also includes cam follower means mounted to the pin member for coacting with the cam means to cause the pin member to move between the first and second positions.

From a safety point of view, such a control means eliminates the pinch points associated with the torquing or rotating drive dogs of the prior art that are located above the track and accessible to the operating personnel. Additionally, such a control means is especially suited for contaminated ambient conditions such as paint finishing systems and corrosive part washers. In other words, such a control means will continue to function properly even when substantially clogged by paint or the like.

BRIEF DESCRIPTION OF THE DRAWINGS

FIG. 1 is a somewhat schematic plan view of a portion of a power and free conveyor system including a transfer zone between a forwarding power track and a receiving power track.

FIG. 2 is a side elevational view of the conveyor system shown in FIG. 1 including a trolley member having the control means of the present invention.

DESCRIPTION OF THE PREFERRED EMBODIMENT

Figure 3:
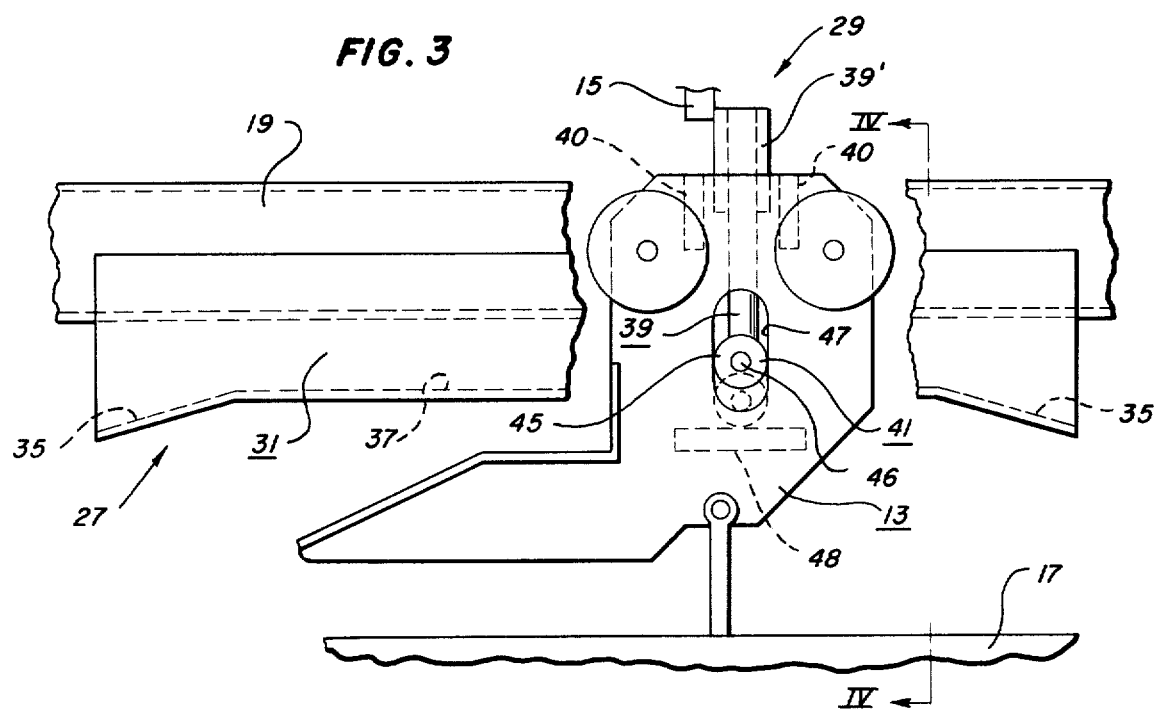
FIG. 3 is a detailed view of a portion of FIG. 1 with certain portions broken away to clearly show the trolley member having the control means of the present invention.
Figure 4:
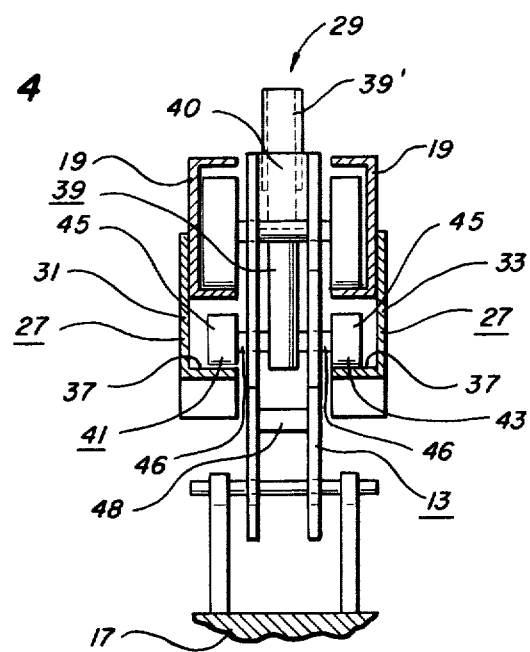
FIG. 4 is a sectional view of the trolley member having the control means of the present invention as taken on line IV—IV of FIG. 3.
Figure 5:
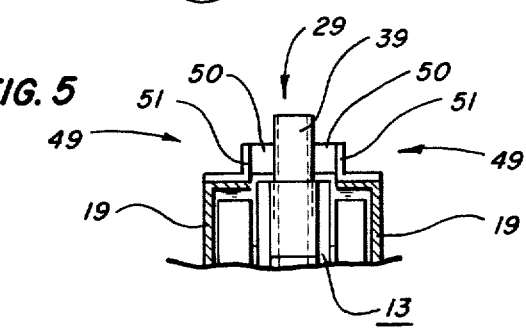
FIG. 5 is a sectional view similar to FIG. 4 showing a portion of the trolley member having the control means of the present invention and including brake means for regulating the speed of the trolley member.

The control means of the present invention is for use with a typical conveyor system 11 which includes a trolley member 13 selectively driven by a pusher member 15 to move a load 17 from one location to another. Preferably, the conveyor system 11 is of the typical power and free type which includes a load supporting track 19 onto which the trolley member 13 is movably mounted and includes a power track 21 adjacent the load supporting track 19 from which the pusher member 15 is supported by well-known means. In such a power and free conveyor system, there is included a leading trolley member 23 and, preferably, an intermediate trolley member 25. The trolley member 13 acts as a trailing trolley member to coact with the leading and intermediate trolley members 23, 25 to support the load 17. As evidenced by the prior art, such conveyor systems are well known to those skilled in the art and need not be discussed in detail to sufficiently disclose the present invention.

The control means of the present invention includes cam means 27 for fixedly mounting to the conveyor system 11 in proximity with the trolley member 13 and includes dog means 29 for movably mounting in the trolley member 13 to coact with the cam means 27 to allow the pusher member 15 to drive the trolley member 13.

Preferably, the cam means 27 includes a first cam member 31 and a second cam member 33 for fixedly mounting as by welding or the like one on either side of the load supporting track 19. Each cam member 31, 33 includes at least one inclined actuating portion 35 and a retaining portion 37.

The dog means 29 includes a pin member 39 for vertical movement between a first position substantially within the trolley member 13 and out of the path of the pusher member 15 to allow the pusher member 15 to move without moving the trolley member 13 and a second position extending out of the trolley member 13 and in the path of the pusher member 15 to allow the pusher member 15 to drive the trolley member 13. The structure of the trolley member 13 preferably includes a pair of spaced apart plates 40 that act as guides for the movement of the pin member 39 between the first and second positions. The plates 40 are spaced apart a sufficient distance to provide a substantially large clearance dimension between the plates 40 and the pin member 39. By having such a substantially large clearance dimension, the movement of the pin member 39 is not affected by build-up of paint or the like when the conveyor system 11 is used in a contaminated ambient location such as in paint finishing operations or the like. The upper portion of the pin member 39 which coacts with the pusher member 15 to form a driving connection therebetween is preferably provided with bumper means 39' to insure that the pusher member 15 contacts the pin member 39. In addition, the bumper means 39' may be constructed of a wear resistant material to hinder wear between the pin member 39 and the pusher member 15. The dog means 29 also includes a cam follower means for coacting with the cam means 27 to cause the pin member 39 to move between the first and second positions. It should be noted that the pin member 39 is preferably moved from the first position to the second position by the cam means 27 and is preferably moved from the second position back to the first position by the force of gravity or the like. Preferably, the cam follower means includes a first cam follower member 41 and a second cam follower member 43 mounted one on either side of the pin member 39 for coacting with the first and second cam members 31, 33 respectively to cause a stable and uniform movement of the pin member 39 between the first and second positions. Each cam follower member 41, 43 preferably consists of a cam roller 45 pivotably mounted to a shaft 46 that is fixedly mounted to the pin member 39 through openings 47 provided in the sides of the trolley member 13. Various stop means may be provided to prevent the pin member 39 from any downward movement past the first position. For example, the bottom of the openings 47 in the sides of the trolley member 13 may be located so as to contact the shaft 46 of each cam follower member 41, 43 when the pin member 39 is in the first position to prevent further downward movement thereof. In addition, the structure of the trolley member 13 may include a plate 48 located beneath the pin member 39 so that when the pin member 39 is in the first position, the bottom of the pin member 39 contacts the plate 48 to prevent further downward movement of the pin member 39.

The control means of the present invention preferably includes brake means 49 for selectively coacting with the pin member 39 when the pin member 39 is in the second position to regulate the speed of the trolley member 13. The brake means 49 may consist simply of brake pads 50 and support members 51 fixedly attached to the load supporting track 19 in proximity with the pin member 39 when the pin member 39 is in the second position so that the brake pads 50 frictionally engage the pin member 39 to control the speed of the trolley member 39. That is, at any location in the conveyor system 11 where it is desired to reduce the speed of the trolley member 13, cam means 27 is mounted on the load supporting track 19 to cause the pin member 39 to be moved to the second position adjacent the brake means 49 and, thereby, be frictionally engaged by the brake means 49. In addition, the brake means 49 may be controlled by hydraulic pistons or the like in a manner well known to those skilled in the art to vary the amount of control over the speed of the trolley member 13 by varying the amount of friction applied by the brake pads 50 to the pin member 39.

The control means of the present invention is particularly useful in a typical power and free conveyor system for transferring a load 17 carried by at least a leading trolley member 23 and a trailing trolley member 13 (or in some cases it may be desirable to use other combinations) from a forwarding power track 21' to a receiving power track 21'' through a transfer station 55, i.e., through that portion of the load supporting track 19 that extends between the forwarding power track 21' and the receiving power track 21''. It should be noted that normally the leading trolley member 23 includes a dog member 53 for coacting with a pusher member 15 to drive the load 17 from one location to another. When the leading trolley member 23 approaches a transfer station 55, the pusher member 15 moves away from the dog member 53 of the leading trolley member 23 so that when the leading trolley member 23 is fully in the transfer station 55 the dog member 53 is no longer driven by the pusher member 15. However, as the leading trolley member 23 approaches the transfer station 55, the trailing trolley member 13 approaches the cam means 27 so that when the leading trolley member 23 is just ahead of the transfer station 55, the pin member 39 of the trailing trolley member 13 is moved to the second position by the coacting of the cam follower means and the cam means 27. That is, the cam rollers 45 of the first and second cam follower members 41, 43 contact the inclined actuation portions 35 and the restraining portions 37 of the first and second cam members 31, 33 causing the pin member 39 to move to and remain in the second position. In this manner, the load 17 is driven by the trailing trolley member 13 until the leading trolley member 23 passes through the transfer station 55 to the receiving power track 21''. When the leading trolley member 23 is in position beneath the receiving power track 21'', a pusher member 15 of the receiving power track 21'' engages the dog member 53 of the leading trolley member 23 to drive the leading trolley member 23 and, therefore, the load 17. As the pusher member 15 of the receiving power track 21'' engages the dog member 53 of the leading trolley member 23, the cam rollers 45 of the trailing trolley 13 move past restraining portions 37 of the cam means 27 thereby allowing the pin member 39 to return to the first position by the force of gravity or the like. Preferably, each cam member 31, 33 includes inclined actuating portions 35 on each end of the restraining portions 37 for use in preventing jamming of the first and second cam follower members 41, 43 against the first and second cam members 31, 33 in case the direction of travel of the trolley member 13 is reversed for some reason. It should be noted that when the forwarding and receiving power tracks 21', 21'' are moving at unequal speeds, to prevent the possibility of the dog member 53 of the leading trolley member 23 from being forced into the rear of a pusher member 15 of the receiving power track 21'', the dog member 53 and the accompanying hold-back dog 57 may be depressed by a cam member (not shown) in a manner well known to those skilled in the art.

As thus constructed and operated, the control means of the present invention allows the pin member 39 to be moved from the first position to the second position in a true vertical motion without any pivoting or torquing motion thereof. In addition, due to its simple construction the control means of the present invention is inexpensive and may be used in contaminated ambient conditions without the likelihood of malfunctioning. Also, the symmetry of design of the control means of the present invention provides stability of the trolley member 13 thereby eliminating the necessity for the typical carrier stabilizers and the like.

Although the invention has been described and illustrated with respect to a preferred embodiment thereof, it is not to be so limited since changes and modifications may be made therein which are within the full intended scope of the invention.

I claim:

1. Control means for use with a typical conveyor system which includes a trolley member selectively driven by a pusher member to move a load from one location to another, said control means comprising:
   a. cam means for fixedly mounting to the conveyor system in proximity with the trolley member, said cam means including first and second cam members for mounting to the conveyor system with one on either side of and in proximity with the trolley member; and
   b. dog means for movably mounting in the trolley member, said dog means including a pin member for vertical movement between a first position out of the path of the pusher member to allow the pusher member to move without moving the trolley member and a second position in the path of the pusher member to allow the pusher member to drive the trolley member, said dog means including cam follower means mounted to said pin member for coacting with said cam means to cause said pin member to move between the first and second positions, said cam follower means of said dog means including first and second cam follower members mounted one on either side of said pin member, said first and second cam members and said first and second cam follower members coacting together to cause a stable and uniform movement of said pin member between the first and second positions.

2. The control means of claim 1 in which said pin member falls from the second position to the first position by the force of gravity after said cam follower means passes said cam means.

3. The control means of claim 1 in which is included brake means for selectively coacting with said pin member when said pin member is in the second position to regulate the speed of the trolley member.

4. Control means for use with a typical conveyor system which includes a load supporting track, a trolley member movably mounted on the load supporting track for supporting a load, a power track adjacent the load supporting track, and a pusher member for selectively driving the trolley member to move the load from one location to another, said control means comprising:
   a. cam means for fixedly mounting to the load supporting track, said cam means including first and second cam members for mounting one on either side of the load supporting track; and
   b. dog means for movably mounting in the trolley member, said dog means including a pin member for vertical movement between a first position substantially within the trolley member and out of the path of the pusher member to allow the pusher member to move without moving the trolley member and a second position extending out of the trolley member and in the path of the pusher member to allow the pusher member to drive the trolley member, said dog means including cam follower means mounted to said pin member for coacting with said cam means to cuase said pin member to move between the first and second positions, said cam follower means including first and second cam follower members for mounting one on either side of said pin member and for coacting with said first and second cam members to cause a stable and uniform movement of said pin member between the first and second positions.

5. The control means of claim 4 in which said pin member falls from the second position to the first position by the force of gravity after said cam follower means passes said cam means.

6. The control means of claim 4 in which is included brake means for selectively coacting with said pin member when said pin member is in the second position to regulate the speed of the trolley member.

7. The combination with a typical power and free conveyor system which includes a load supporting track, a trolley member movably mounted on the load supporting track for supporting a load, a power track adjacent the load supporting track, and a pusher member supported from the power track for selectively driving the trolley member from one location to another, of control means for causing the trolley member to move relative with the pusher member, said control means comprising:
   a. cam means fixedly mounted on the load supporting track, said cam means including first and second cam members mounted one on either side of the load supporting track; and
   b. dog means movably mounted in the trolley member, said dog means including a pin member for vertical movement between a first position substantially within the trolley member and out of the path of the pusher member to allow the pusher member to move without moving the trolley member and a second position extending out of the trolley member and in the path of the pusher member to allow the pusher member to drive the trolley member, said dog means including cam follower means for coacting with said cam means to cause said pin means to move between the first and second positions, said cam follower means of said dog means including first and second cam follower members mounted one on either side of said pin member, said first and second cam members and said first and second cam follower members coacting together to provide a stable and uniform movement of said pin member between the first and second positions.

8. The combination with a typical power and free conveyor system which includes a load suporting track, a trolley member movably mounted on the load supporting track for supporting a load, a power track adjacent the load supporting track, and a pusher member supported from the power track for selectively driving the trolley member from one location to another, of control means for causing the trolley member to move relative with the pusher member, said control means comprising:
- a. cam means fixedly mounted on the load supporting track;
- b. dog means movably mounted in the trolley member, said dog means including a pin member for vertical movement between a first position substantially within the trolley member and out of the path of the pusher member to allow the pusher member to move without moving the trolley member and a second position extending out of the trolley member and in the path of the pusher member to allow the pusher member to drive the trolley member, said dog means including cam follower means for coacting with said cam means to cause said pin means to move between the first and second positions; and
- c. brake means for selectively coacting with said pin member when said pin member is in the second postion to regulate the speed of the trolley member.

* * * * *